INVENTOR.
KENNETH A. COOK
BY
Wheeler, Wheeler & Wheeler
ATTORNEYS

INVENTOR.
KENNETH A. COOK
BY
Wheeler, Wheeler & Wheeler
ATTORNEYS

United States Patent Office 2,993,408

Patented July 25, 1961

2,993,408

APPARATUS FOR SYNCHRONIZING THE OPERATION OF A PROJECTOR WITH A TAPE PLAYER

Kenneth A. Cook, 5912 N. Santa Monica Blvd., Milwaukee, Wis.

Filed May 22, 1958, Ser. No. 737,129
2 Claims. (Cl. 88—28)

This invention relates to a method and apparatus for synchronizing the operation of a projector with a tape player.

In the method and apparatus of the present invention, an electrically actuated film changer of a slide projector or the like is triggered in timed co-ordination with the movement of the tape past the sound reproducing head of a tape player. The pinch roller of the tape player drives an intermittently actuated film changer switch. The apparatus is such that the travel of a predetermined lengh of tape past the reproducing head is translated into intermittent actuation of the film changer switch. Accordingly, the tape and projector can be synchronized and an entire video-audio program can be performed without the attention of any operator. The method and apparatus of the present invention is particularly useful in industrial training, sales presentation, teaching, etc.

The invention is characterized by a mechanical transducer which translates the travel of a predetermined fixed length of tape into synchronized pulses of signalling current to the electric film changer on the projector. The transducer is driven by a belt from the pinch roller of the tape player. The transducer may specifically comprise a mutilated gear set having a Geneva motion, one of the parts of which comprises a switch actuator having a cam surface which actuates the arm of a microswitch during the interaction of the gear teeth of the mutilated gear set.

The device of the present invention also includes means for adjusting or presetting the time or point of interaction of the teeth of the mutilated gear set, this means being settable independently of the drive to the gear set from the pinch roller.

The method of the invention comprises the steps of moving a predetermined length of tape past the sound reproducing head of the tape player, translating the movement of the tape into intermittent motion of an actuator, and signalling to the film changer in response to actuator motion.

Other objects, advantages and features of the invention will appear from the following disclosure in which.

Figure 1:
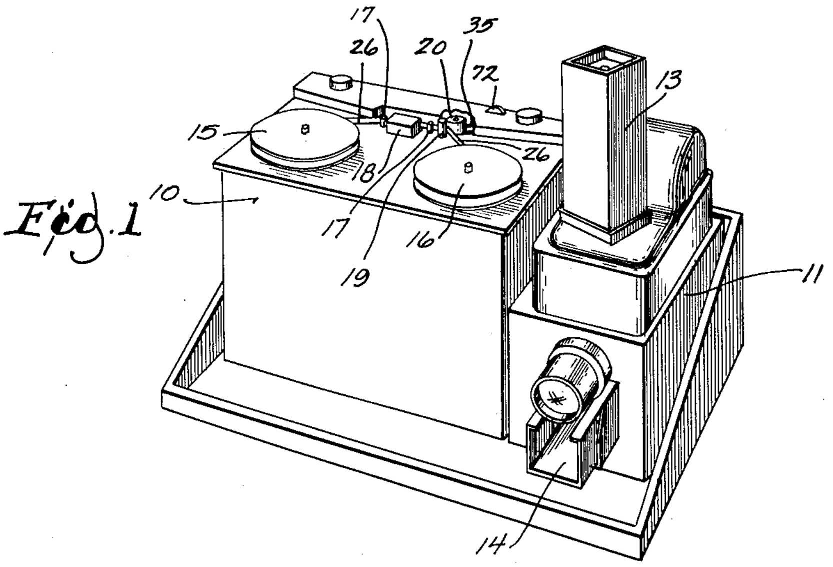
FIG. 1 is a perspective view of a combined tape player and slide projector embodying the present invention.
Figure 2:
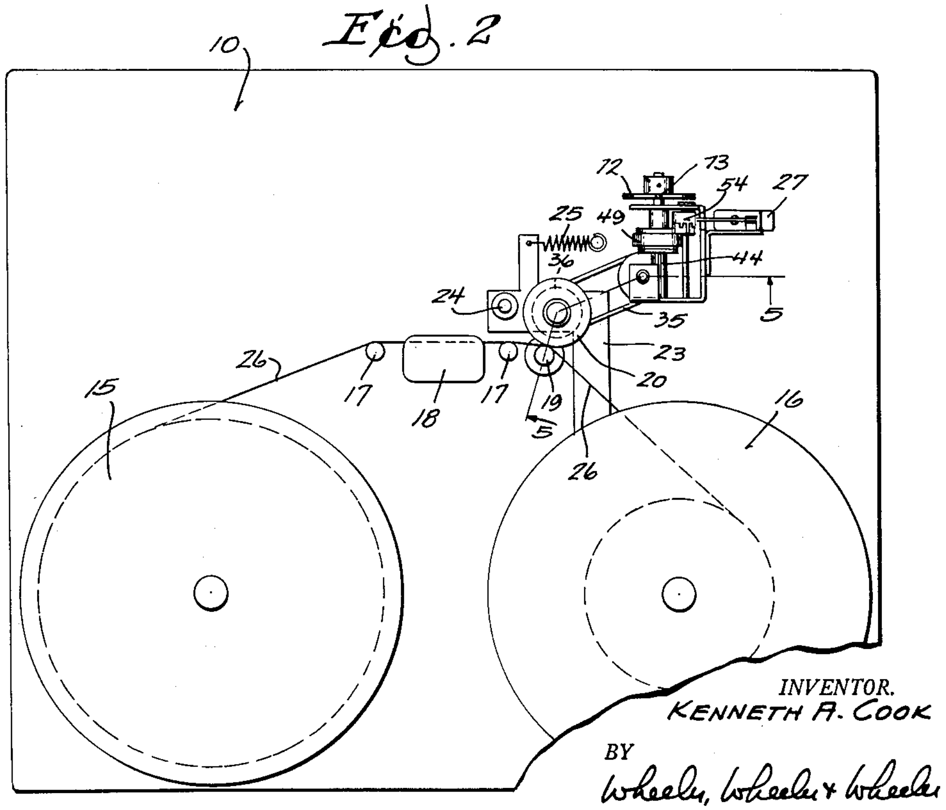
FIG. 2 is a fragmentary plan view of the deck of the tape player of FIG. 1, the cover being removed to expose the mechanical transducer interconnected by a belt to the pinch roll of the tape player.

The tape player 10 and slide projector 11 are otherwise conventional and may be purchased from commercial sources. The present invention is not limited to any particular brand or type of player and projector. The projector 11 is conventionally supplied with an electric film changer 12 (FIG. 8) which may comprise an electric motor or solenoid type actuator which when energized will actuate mechanism to change the slide transparency aligned with the lens of the projector. In the particular projector 11 illustrated in the drawings, the slides are housed in a vertical magazine 13. On actuation of the film changer 12, the slides will feed downwardly by gravity into alignment with the lens of the camera and will ultimately be discharged through chute 14.

The tape player 10 has a tape feed spool 15, a tape takeup spool 16, tape guides 17, a sound reproducing head 18, a capstan 19 and a pinch roller 20 which is mounted on an arm 23 swingable about the pivot pin 24 and biased by spring 25 toward the capstan 19 and intervening tape 26. The capstan 19 is driven by a motor (not shown). The capstan is driven at such a speed that for the purpose of the present disclosure the tape 26 will travel past the head 18 at the conventional speed of 3¾" per second. The programming is prearranged so that a predetermined time (for example 15 seconds) is allotted for the concurrent exhibition of each film and concurrent audio broadcast from the tape. Accordingly, in the example given, the film changer 12 should be actuated at 15 second intervals, this corresponding to the movement of 56¼" of tape past the reproducing head 18.

Figure 8:
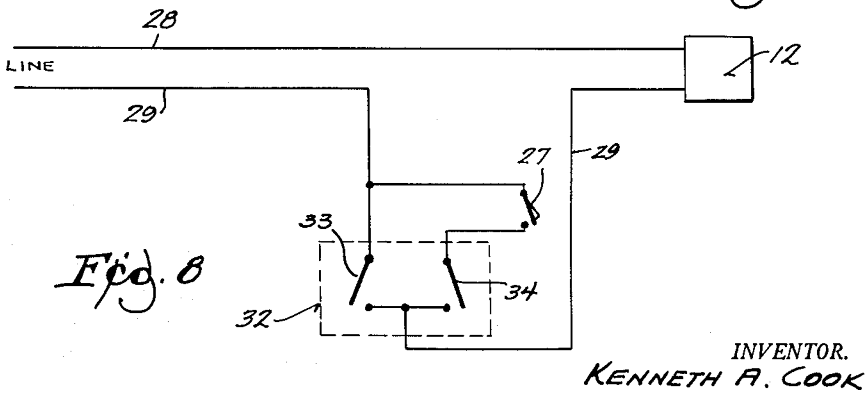
FIG. 8 is a simplified circuit diagram of the switching apparatus.

To trigger the film changer 12 at the stated intervals, switch 27 is disposed in the circuit shown in FIG. 8. Line 28 supplies the film changer 12 directly and line 29 is connected to the film changer 12 through a switching network including switch selector means 32. Switch selector means 32 includes a "manual" switch 33 which, if manually closed, will trigger the film changer 20. However, if "automatic" selector switch 34 is closed and manual switch 33 is open, this will place in circuit with the film changer 12 the switch 27 which is actuated by the synchronizing transducer now to be described.

The synchronizing transducer shown in FIGS. 2 through 7 is driven from the belt 35 trained around a pulley 36 fastened to the shaft 37 of the pinch roller 20. Accordingly, belt 35 will be driven in timed coordination with the movement of the tape 26 past the capstan 19.

Belt 35 drives the pulley 38 mounted on the frame 39 of the synchronizer apparatus. Pulley 38 has a shaft 42 carrying a worm 43 meshing with worm wheel teeth 44 formed on sleeve 41 otherwise freely rotatable on the shaft 45. Sleeve 41 has an end flange 46 provided with an axially extending locking pin 47 keying the flange 46 to plate 48 of an overrunning clutch which connects the worm wheel sleeve 41 to mutilated gear 49.

Gear 49 is mounted for rotation on the shaft 45 and is provided with single tooth means 52 adapted to successively engage long teeth 53 on the cam actuator 54 for the actuating arm 55 of the microswitch 27. Cam 54 may be regarded as a second mutilated gear and is provided in alternate series with long teeth 53 and with interspersed short teeth or lugs 56. Mutilated gear 49 has a rabbeted peripheral edge 57 which constitutes a holding ledge on which cam tooth 53 rides until engaged by the tooth 52 of the gear, whereupon the cam 54 will be carried by the gear 49 through ¼ of a revolution to actuate the lever 55 on alternate quarter revolutions of the cam 54. Cam 54 has two opposed curved cam surfaces 50 and interspersed opposed flat surfaces 51 of less radial extent than the curved surfaces 50. Accordingly, gear 49 must rotate through 720° for each intermittent closure of the switch 27 in the specific embodiment illustrated. The mutilated gears 49, 54, accordingly, constitute a form of Geneva drive between the pinch roller 20 and switch arm 55 and translate the uniform motion of the tape to intermittent closure of the switch. In a commercial embodiment of the invention the transducer is so constructed that switch 27 is actuated once every fifteen seconds which is equivalent to the passage of 56¼ inches of tape past the reproducing head 18.

Figures 3, 4, 5, 6, 7:
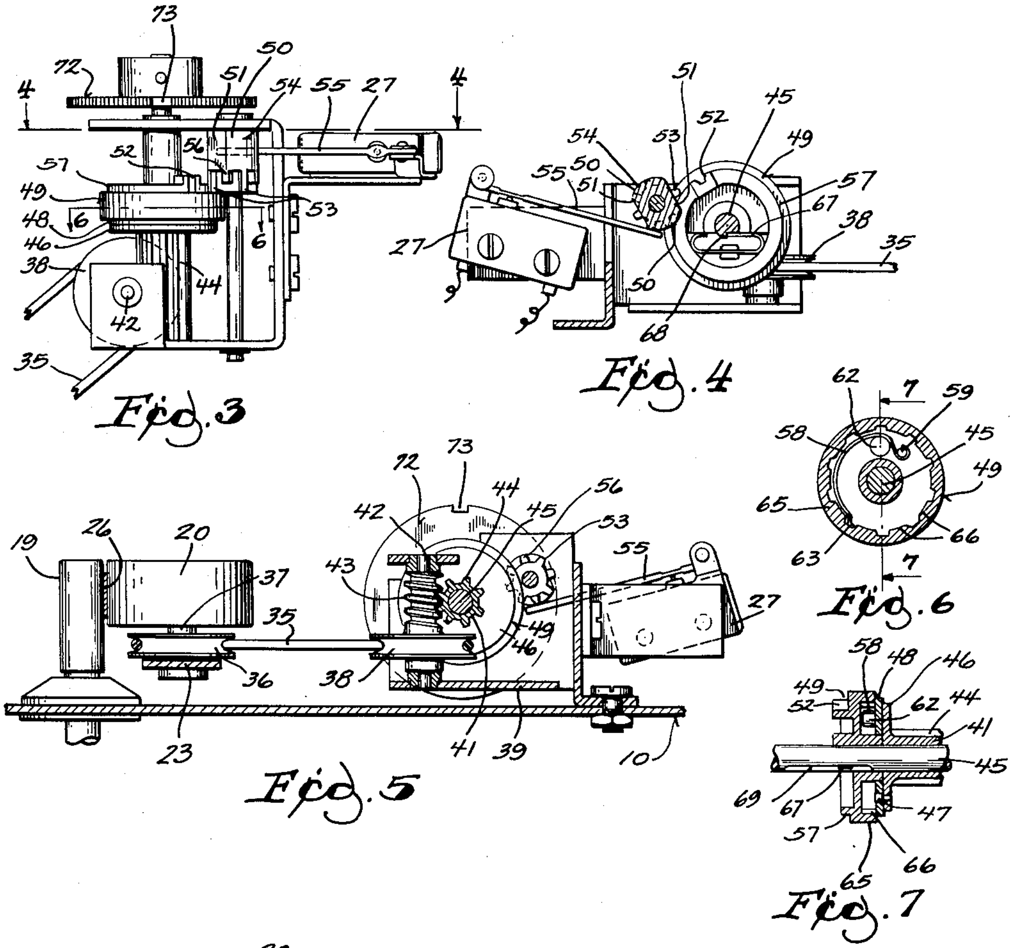
FIG. 3 is an enlarged plan view of the transducer aforesaid.
FIG. 4 is a cross section taken along the line 4—4 of FIG. 3.
FIG. 5 is a cross section taken along the line 5—5 of FIG. 2.
FIG. 6 is a fragmentary cross section taken along the line 6—6 of FIG. 3.
FIG. 7 is a cross section taken along the line 7—7 of FIG. 6.

The overrunning clutch connection between the plate 48 and the mutilated gear 49 is best shown in FIGS. 6 and 7 and consists of a clock spring 58 secured at one end to a pin 59 projecting from one face of the gear 49. Spring 58 is resiliently bent around a biasing post 62 and has its free end 63 turned to engage teeth 66 formed on the inner periphery of an overhanging flange 65 of the gear 49. The end of the spring will engage against the teeth 66 to prevent retrograde movement of the gear with respect to the plate 48 and worm wheel sleeve 41 to which the plate is connected by the pin 47 but will permit the gear 49 to be advanced manually for presetting the time position of the gear with respect to the switch actuator. The gear 49 may be turned manually by rotation of the shaft 45, the motion of which is transmitted to the gear 49 through a second overrunning clutch consisting of a clock spring 67 which has a free end engaged with a shoulder 68 formed by notching the shaft 45 at 69. Spring 67 is anchored intermediate its length between lugs 64 projecting axially from the gear 49.

Shaft 45 is fastened to a manual adjusting wheel 72, the rotation of which is communicated to gear 49 through the shaft 45 of the overrunning clutch spring 67 to advance its gear tooth means 52 into desired spaced relationship to a tooth 53 of the switch actuator cam 54. Accordingly, when the tape is first placed in the machine, visual indicia on the tape may be properly located with respect to a reference point on the tape player and the visual indicia 73 on the wheel 72 likewise properly located with respect to a reference point, thus to properly orient the clutch parts for proper synchronization of the player and projector.

All the operator has to do is to place the slides in their proper order in the magazine 13, thread the tape on the machine with the indicia thereon properly located with respect to its reference point, properly set the indicia 73 of the hand wheel 72 and thereafter start the tape player. As the tape travels through the machine, the pinch roller 20 will drive the transducer so that switch 27 is actuated at fifteen second intervals to trigger the film changer 12. Accordingly, a sales presentation or teaching program can be automatically performed without further attention on the part of the operator. If the operator wishes to trigger the film independently of the transducer, switch 34 is opened and manual switch 43 may then be used to trigger the film changer 12. While switches 32 and 34 are shown separately in FIG. 8, they may be incorporated in a single switch mechanism.

The novel method of the present invention can be performed by hand. Switch 34 is opened. By closing switch 33 at 15 second intervals, the tape and projector will be synchronized.

I claim:

1. Apparatus to synchronize a projector having an electric film changer with a tape player having a capstan and pinch roller between which tape is threaded, said apparatus comprising an electric circuit to the electric film changer, selector switch means in said circuit, said selector switch means having a manual and an automatic switch setting, a film changer triggering switch in series with the automatic setting of the selector switch means, and means driven from said pinch roller in timed coordination with the movement of the tape to intermittently actuate the triggering switch and change film in timed coordination with tape movement when the selector switch means is on automatic setting, the last mentioned means comprising a switch actuator, a transducer having an intermittently driven output part coupled to the switch actuator, a constantly driven input part and a drive belt from the pinch roller to the said input part.

2. The device of claim 1 in which the transducer comprises a mutilated gear set.

References Cited in the file of this patent

UNITED STATES PATENTS

| | | |
|---|---|---|
| 2,279,119 | Freimann | Apr. 7, 1942 |
| 2,503,239 | Antos | Apr. 11, 1950 |
| 2,699,089 | Jakobs et al. | Jan. 11, 1955 |
| 2,820,863 | Swanson | Jan. 21, 1958 |
| 2,853,923 | Daniel | Sept. 30, 1958 |